United States Patent [19]

Cox

[11] Patent Number: 4,775,855
[45] Date of Patent: Oct. 4, 1988

[54] HOSE LEAK DETECTORS

[75] Inventor: Andrew P. D. Cox, Grimsby, England

[73] Assignee: Dunlop Limited a British Company, United Kingdom

[21] Appl. No.: 10,635

[22] Filed: Feb. 4, 1987

[30] Foreign Application Priority Data

Feb. 11, 1986 [GB] United Kingdom ................. 8603364

[51] Int. Cl.⁴ ............................................ G08B 21/00
[52] U.S. Cl. .................................... 340/605; 340/515;
340/516; 73/40.5 R; 137/552.7; 137/557;
138/104
[58] Field of Search ............... 340/603, 605, 516, 515,
340/514; 137/551, 552, 552.7, 557, 559; 73/40.5
R, 49.1, 40, 49.2, 49.3; 138/103, 104

[56] References Cited

U.S. PATENT DOCUMENTS

| 3,807,220 | 4/1974 | Ottenstein | 73/40.5 R |
|---|---|---|---|
| 4,043,180 | 8/1977 | Morris | 340/515 |
| 4,088,987 | 5/1978 | Resler | 340/605 |
| 4,314,241 | 2/1982 | La Plante | 340/516 |
| 4,404,842 | 9/1983 | Mooney | 340/605 |
| 4,576,037 | 3/1986 | Cox | 73/40.5 A |

FOREIGN PATENT DOCUMENTS 1374068 5/1972 United Kingdom .

Primary Examiner—Joseph A. Orsino
Assistant Examiner—Jill D. Jackson
Attorney, Agent, or Firm—Stevens, Davis, Miller & Mosher

[57] ABSTRACT

A hose leak detector and a leak detector system for monitoring the leakage of fluid through at least a part of a flexible hose comprises signal generating means operable to generate a warning signal in response to leakage of fluid, test means for actuating the signal generating means, and timer means operable to cause the test means to actuate the signal generating means in a predetermined manner to enable a viability check of the operating capability of the signal generating means to be maintained.

12 Claims, 3 Drawing Sheets

HOSE LEAK DETECTORS

This invention concerns improvements in and relating to leak detectors and leak detector systems for hose and in particular though not exclusively to leak detectors and systems for flexible hose of the type comprising a main fluid retaininq carcass and a secondary fluid retaining carcass enclosing at least part of the length of the main carcass to prevent escape of any fluid leaking through the main carcass.

Flexible hose of the type referred to above is particularly useful offshore for transporting fluids the escape of which would constitute a severe health or safety hazard. It is especially suited to applications where the hose is required to withstand a considerable amount of flexing in use, rough handling during connecting operations and severe weathering, for example as may occur when the hose is used to transport oil from a tanker moored offshore to an installaiion onshore.

Although the secondary carcass may be constructed to provide a load bearing capability sufficient to allow operation of the hose to continue unaffected should fluid leak from the main carcass, it is desirable to provide a means of detecting such leakage so that the damaged hose may be replaced before failure of the secondary carcass occurs.

In our U.K. Patent Publication No. 2117480 (and its equivalent U.S. Pat. No. 4,465,105) there is described a flexible hose of the type referred to above provided with a leak detector mounted externally of the hose, preferably on an end fitting to which the hose is connected. Fluid leaking from the main carcass passes to or pressurizes the leak detector which is powered by batteries, usually contained within the detector casing, and which is operable to generate a warning signal when the pressure of the leaking fluid exceeds a predetermined value.

In our U.K. Patent Publication No. 2138956 (and its equivalent U.S. Pat. No. 4,56,037) it is further taught that test means may be provided for checking the operating capability of the detector, the test means being operable from outside the detector such that the operating capability of the detector may be checked when in situ.

Having regard to the operating environment of the detector which often is underwater the switch means provided in the detector for actuating the test means preferably is of a kind sensitive to an external magnet, and a visual indication of satisfactory operating capability preferably is achieved by means of a light visible through a transparent or translucent portion of the leak detector housing. Thus, the need for moving components and the often associated problems of sealing and accidental damage at the housing surface of the detector are avoided.

Although leak detectors and hose line installations incorporating leak detectors of the aforementioned kind are satisfactory and reliable, their use is not as convenient as may be desired when fitted to a submarine hose line or a hose line of long length and formed from a large number of individual hoses. When a hose line is underwater it is necessary to employ the services of a diver utilizing a magnet to carry out periodic checks on the operating capability of each detector, and when there are a large number of hose lengths, each with their own leak detector, the time necessary to conduct checks is not insignificant.

In the specification of U.K. Pat. No. 1469716 it is described how the possible failure of the hoses of a submarine hose line may be monitored by providing each hose with a fluid passage extending lengthwise in the hose wall between the ends thereof. Successive passages are interconnected and filled with a fluid; the fluid pressure, which is likely to change in the event of a hose failure, is monitored. This arrangement suffers the disadvantage that it is not as speedy and reliable at indicating a hose failure as often is desired, particularly for high pressure and high speed flow hose lines, and does not indicate that particular hose length of a line in which failure has occurred.

The present invention seeks to provide inter alia a leak detector system and a leak detector the operating capability of which may be more readily checked and which facilitates individual monitoring of the hoses comprising a hose line.

In accordance with one aspect of the present invention a hose leak detector system comprises a leak detector for mounting externally of a flexible hose, the leak detector comprising signal generating means operable in response to the pressure of fluid leaking through at least a part of a flexible hose to generate a warning signal and test means for actuating the signal generating means to perform a viability check of the operating capability of the signal generating means, and the system comprising timer means operable to cause the test means to actuate the signal generating means in a predetermined manner.

Preferably the hose leak detector system comprises a monitoring device for location remote from the hose and the signal generating means is operable to generate a warning signal for transmission to and reception by said monitoring device.

In accordance with another aspect of the present invention a hose leak detector for mounting externally of a flexible hose and operable in response to the pressure of fluid leaking through at least a part of the hose to generate a warning signal comprises signal generating means operable to generate a warning signal in the event of fluid leaking, test means for actuating the signal generating means to perform a viability check of the operating capability of the signal generating means, and timer means associated with the test means to cause the test means to actuate the signal generating means in a predetermined manner.

The timer means may be of a simple kind which causes actuation of the test means at regular intervals, say once or twice a day, though non-regular intervals may be provided if desired having regard to the hose operating conditions and procedures.

Typically the timer means may comprise a quartz movement and be powered by the same power source as that provided for the signal generating means when that power source is a battery. The timer means may be interposed between the power source and test means whereby the test means is powered only at predetermined intervals or the test means may be continuously powered and the timer means arranged to supply a signal to the test means only at predetermined times for causing the test means to acutate the signal genarating means. Alternatively the timer means of a leak detector system may be located at the monitoring device and be powered independently of the signal generating means.

A leak detector system may comprise a plurality of leak detectors only some of which have timer means associated therewith, and one or more monitoring devices which incorporate timer means for causing actuation of test means in the or those leak detectors which do not have timer means associated therewith.

The duration of the warning signal from the signal generating means when actuated by the test means preferably is short, for example one minute or less, so as to avoid possible confusion with a signal arising from actuation of the signal generating means in consequence of the pressure of fluid leaking through the flexible hose. The duration of a viability check signal from the signal generating means may be determined either by the timer means, particularly where that is interposed between the power source and test means, or by the test means.

The signal generating means may generate a visual warning signal or a non-visual signal—an ultrasonic signal being particularly preferred for a leak detector for use under water.

The monitoring device of the leak detector system may comprise for example a pen recorder chart or a flashing light, and/or the monitoring device may be a transmitter which for example sends a radio signal to a remote receiving station located outside the range at which signals from the signal generating means of the leak detector may be detected. Either the monitoring device or a remote receiving station may incorporate means for distinguishing between a signal resulting from operation of the test means and one consequential on a failure of a hose, and optionally may incorporate means automatically to shut down the flow through the hose or take other precautionary action such as operation of valves to divert the fluid flow to another hose line.

The monitoring device additionally may perform a verification function to check that a signal is received from the signal generating means in conformity with the predetermined manner of operation of the signal generating means by the timer means. The monitoring device may be arranged additionally to undertake the precautionary action referred to in the preceding paragraph in the event of non-receipt of an expected viability check signal from the signal generating means.

In another of its aspects the present invention provides a hose line comprising a series of flexible hoses and associated with each flexible hose a leak detector or the leak detector of a system in accordance with the present invention.

Preferably the operation of each leak detector is such that at least the signals from the respective signal generating means in response to actuation by their associated test means are distinguishable one from another. This may be achieved by timer means causing each leak detector to operate at a different moment in time, by each test signal being of characteristic duration, or by the signal generating means emitting a signal characteristic of the leak detector for example by virtue of being coded or of a duration which is unique at least amongst the leak detectors of the hose line. Operation of the signal generating means to provide a signal which is unique to the associated leak detector at least amongst the leak detectors of a hose line is preferred since then it is possible for a monitoring device to distinguish between those signals received not only in response to viability checks but also in response to leakage of one of the individual hoses.

Two embodiments of the invention will now be described, by way of example, with reference to the accompanying diagrammatic drawings wherein.

Figure 1:
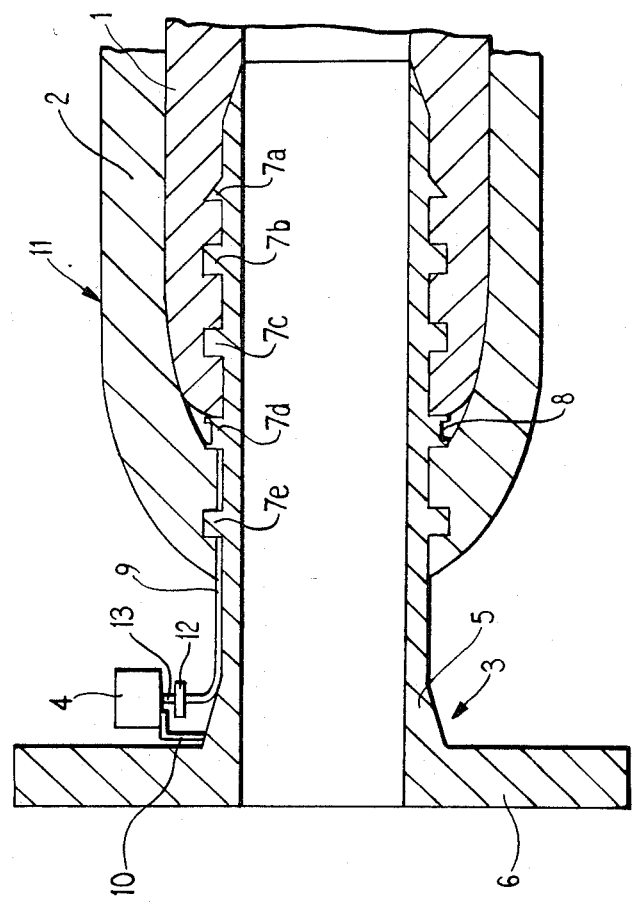
FIG. 1 is a cross-section of one end of a flexible hose having secured thereto a leak detector in accordance with the present invention.

The hose assembly shown in FIG. 1 comprises a flexible hose 11 having a main fluid retaining carcass 1 and a secondary fluid retaining carcass 2 surrounding the main carcass 1 over the whole length thereof, a respective end fitting 3 at each end of the hose 11 to which the main and secondary carcasses 1 and 2 are secured and a respective leak detector 4 mounted on each end fitting for detecting fluid leaking from the main carcass 1. The construction of the leak detector 4 is described later in more detail.

The main and secondary carcasses 1 and 2 each comprise an inner liner, a reinforcement structure and an outer cover, the outer cover of the secondary carcass 2 forming the outer cover of the hose. The reinforcement structures of the main and secondary carcasses are both constructed to be capable of withstanding the operating pressure of fluid transported through the hose independently of one another so that in the event of the main carcass failing the presence of the secondary carcass will allow the hose to continue operation. For further details of the construction of the hose the reader is directed to our U.K. Patent Publication No. 2117479.

The end fitting 3 comprises a nipple portion 5 received within the bore of the hose and an end flange portion 6 for securing the hose assembly to a successive hose assembly or to a fixed fluid inlet/outlet. The radially outer surface of the nipple portion 5 is provided with five axially spaced ribs 7a,b,c,d and e and the main carcass 1 engages the first three ribs 7a,b and c remote from the end flange 6 and abuts against the fourth rib 7d. The secondary carcass 2 engages the fourth and fifth ribs 7d and 7e.

The fourth rib 7d is formed with a continuous annular groove 8 in the radially outer surface thereof. Groove 8 leads via a bore (not shown) internal of the rib 7d to an axially extending small bore steel tube 9 which in turn leads to the leak detector 4 mounted externally of the hose on the end fitting 3 ty means of a bracket 10. Fluid leaking from the main carcass 1 is retained by the secondary carcass 2 and flows along the length of the hose tetween the carcasses 1 and 2 to either end fitting where it enters groove 8 and flows via tube 9 to the associated leak detector 4 which is operable in response to the pressure of the leaked fluid to generate a warning signal.

The steel tube 9 is connected to the leak detector 4 via a one-way valve 12 and a flexible tube 13 releasably secured to the valve 12. The tube 13 may have a length less than the length of the steel tube 9. The valve 12 mounted on an end of the tube 9 allows fluid to flow from the tube 9 to the leak detector 4 but prevents the flow of fluid in the reverse direction.

Accordingly the leak detector 4 may be removed by disconnecting the tube 13 from the valve 12 and a replacement leak detector fitted while the hose is in situ, and this replacement may be effected even when the hose forms part of a submerged hose line because reverse flow of fluid into the tube 9 is prevented.

Figure 2:
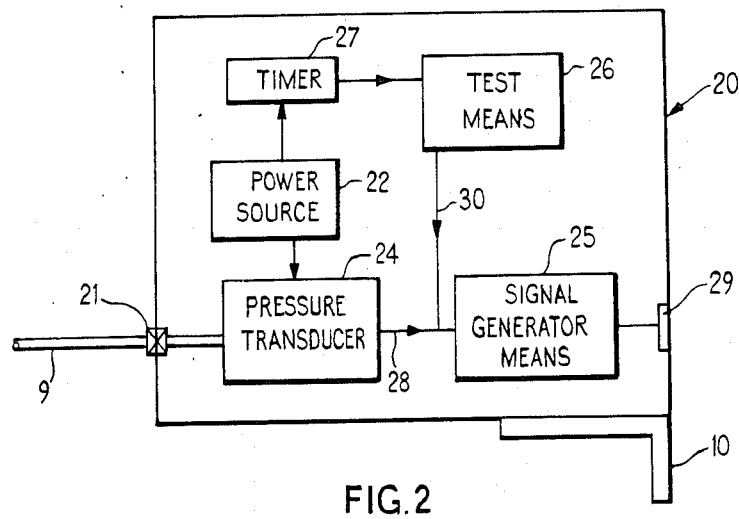
FIG. 2 shows diagrammatically a leak detector in accordance with one embodiment of the present invention.

The leak detector 4 will now be described in more detail with reference to FIG. 2.

The leak detector 4 comprises a water-tight plastics or metal casing 20 secured to the hose end fitting bracket 10 and having a connection 21 to which the flexible tube 13 is secured. Located within the housing 20 is a power source 22 comprised by long life batteries, a pressure transducer 24, a signal generating means 25, a test means 26 and a timer 27.

The pressure transducar 24 is electrically powered by the power source 22 and in response to the magnitude of the applied pressure sends a related electrical signal through the connection 28 to the signal generating means. The signal generating means is designed to emit an ultrasonic signal from the emitter 29 mounted on the casing 20 when the electrical signal applied by connection 28 exceeds or falls below a predetermined voltage associated with the application of a fluid pressure to the pressure transducer indicative of a hose failure. It is particularly preferred that the signal generating means provide a warning signal when the electrical signal in connection 28 either exceeds a predetermined voltage or falls telow a predetermined voltage so as to respond to failures which cause either an improper increase or decrease of pressure in the line 12.

The test means 26 is powered from the power source 22 via interposed timer 27, and the timer is arranged to cause the test means to send through connection 30 to the signal generating means a test signal of one minute's duration at predetermined intervals. The test signals given at predetermined intervals, say every 24 hours, alternate between high and low voltages corresponding respectively to the signals provided by the pressure transducer through connection 28 when the pressure exceeds or falls below the normal fluid pressure in the line 9.

Figure 3:
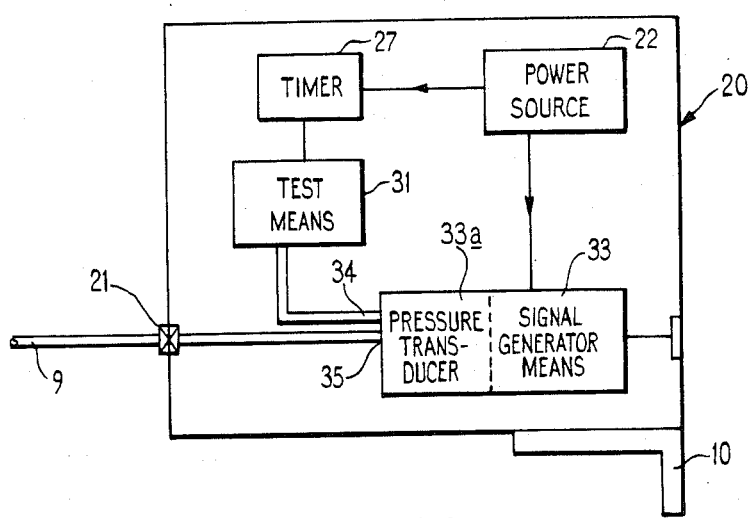
FIG. 3 shows diagrammatically a leak detector in accordance with another embodiment of the present invention.

In a second embodiment of the invention, illustrated with reference to FIG. 3, the test means 31 is of a kind which provides a fluid pressure signal in line 32 in contrast to the electrical signal in connection 30 provided by the test means 26 of the FIG. 2 embodiment. In the FIG. 3 embodiment the signal generating means 33 incorporates a pressure transducer 33a of a kind which provides an internal electrical signal to the signal generating means when receiving an unduly high or low pressure from either of the input ports 34,35. While in this embodiment of the invention the test means must be of a more sophisticated and elaborate design than the test means 26 in order to provide a pressurized fluid type signal it has the advantage of conducting viability checks not only on the signal generating means but also the pressure transducer.

In either embodiment the test means may be arranged so that the signal generating means is operable to generate a viability check warning signal, the duration of which varies with successive actuations by the timer means.

Figure 4:
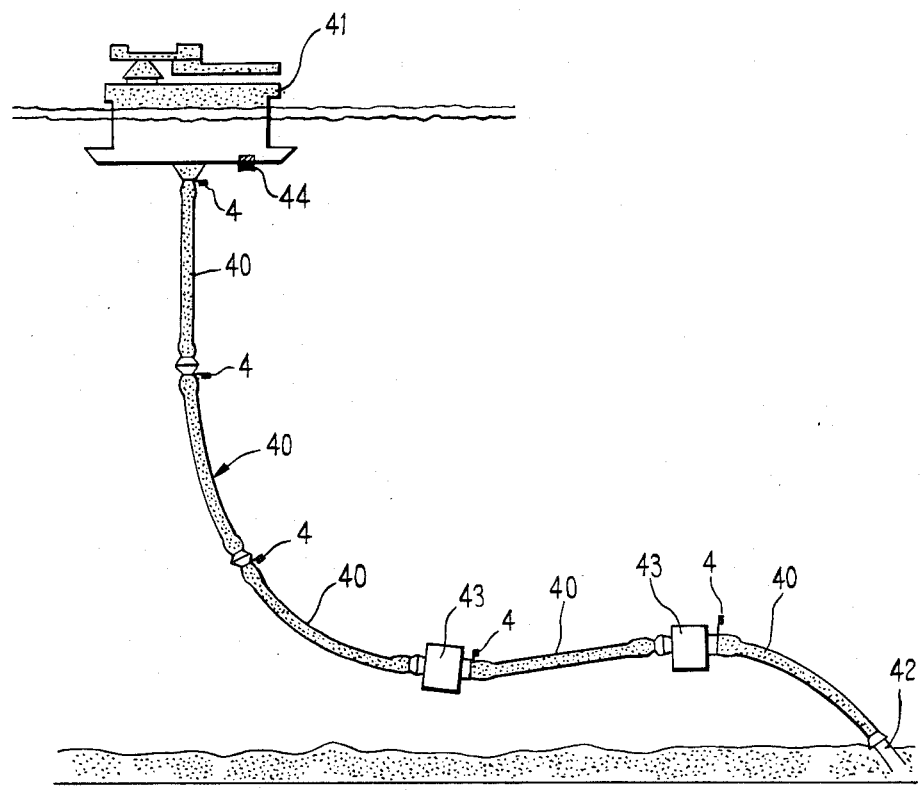
FIG. 4 shows a submarine hose line installation which incorporates a leak detector system in accordance with the present invention.

FIG. 4 shows a hose line comprising five hoses 40 interconnected and arranged to extend between a floating buoy 41 and a submerged pipeline 42. The lower two hoses of the line have secured to the upper ends thereof external flotation tanks 43 to assist in maintaining the hose in the desired underwater configuration.

The floating buoy 41 has an underwater ultrasonic sensor which is a part of an intermediate monitoring station 44 mounted on the buoy 41 and comprising a power source and radio transmitter which transmits a radio signal to a remote receiving station in response to signals received by the receiver 44 from the emitters of each of the signal generating means of the respective leak detectors.

It is to be understood that the aforedescribed embodiments may be modified in a number of aspects without departing from the scope of the present invention. Thus, it is not essential for the power source or timer to be located within the housing of the leak detector and a separate location may be preferred for some circumstances. Also the pressure transducer may be of a simple form which acts as a pressure responsive switch to allow a current to flow only when a predetermined pressure is exceeded.

The hose leak detector and system of the present invention provides a most useful and significant advance in the art and contribution to safety and environmental protection in that when in use the signal generating means serves continuously to monitor the possible occurrence of a leak while the test means under the control of the timer means routinely checks that the signal generating means is capable of generating a warning signal in the event of a leak occurring.

What I claim is:

1. A flexible hose assembly comprising:
   a flexible hose of the twin carcass type comprising a main fluid retaining carcass and a secondary fluid retaining carcass enclosing at least a part of the length of the main carcass to prevent escape of any fluid leaking through the main carcass,
   a leak detector mounted externally of the hose,
   communication means for communicating to the leak detector any fluid leaking through the main fluid retaining carcass to between said carcasses,
   a monitoring device located remote for the hose,
   said leak detector comprising signal generating means operable in response to an increase of pressure due to fluid leaking though the main carcass to between said carcasses to generate a warning signal for transmission to and reception by said monitoring device, test means for actuating the signal generating means to perform a viability check of the operating capability of the signal generating means, and timer means operable to cause the test means to actuate the signal generating means in a predetermined manner.

2. A flexible hose assembly according to claim 1 wherein the monitoring device is operable to verify that a signal is received from the signal generating means in conformity with the predetermined manner of operation of said signal generating means by said timer means.

3. A flexible hose assembly according to claim 2 wherein sid monitoring device emits a warning signal in response only to receipt of a signal from the signal generating means not in conformity with the predetermined manner of actuation of the signal generating means by said timer means.

4. A flexible hose assembly according to claim 1 wherein the monitoring device is operable to emit a visual or audible signal.

5. A flexible hose assembly according to claim 1 wherein the monitoring device comprises a transmitter operable to send a radio signal to a remote receiving station in response to receipt of a signal from the signal generating means.

6. A flexible hose assembly according to claim 1 wherein a plurality of leak detectors are provided and the monitoring device is operable to monitor for receipt of a signal from any one of said plurality of leak detectors.

7. A flexible hose assembly according to claim 6 wherein the monitoring device is operable to emit a warning signal which identifies that leak detector from which a signal has been received.

8. A flexible hose assembly according to claim 6 wherein each leak detector is operable to generate a characteristic warning signal distinguishable from the warning signals of other leak detectors of the flexible hose assembly.

9. A flexible hose assembly according to claim 6 wherein each leak detector has associated therewith respective timer means the operation of which enables the monitoring device to distinguish the warning signal of a leak detector from other leak detectors of the system.

10. A flexible hose assembly according to claim 1 wherein the timer means is operable to cause operation of a signal generating means at regular intervals of time.

11. A flexible hose assembly according to claim 1 wherein the signal generating means is operable to generate a viability check warning signal the duration of which varies with successive actuations by the timer means.

12. A flexible hose assembly according to claim 1 wherein the signal generating means is operable to generate a non-visual warning signal.

* * * * *